United States Patent [19]

Decker et al.

[11] Patent Number: 4,667,868
[45] Date of Patent: May 26, 1987

[54] PALLET FOR HOLDING COMPONENTS IN A SOLDERING MACHINE

[75] Inventors: Ronald G. Decker; John P. Hohmann, both of Sunnyvale; George R. Morones, Campbell, all of Calif.

[73] Assignee: Electrovert Limited, Toronto, Canada

[21] Appl. No.: 915,657

[22] Filed: Oct. 6, 1986

[51] Int. Cl.[4] .......................................... B23K 37/04
[52] U.S. Cl. .................................. 228/49.1; 118/503; 269/903
[58] Field of Search .................. 228/49.1, 43; 269/43, 269/903, 228; 211/41; 118/503

[56] References Cited

U.S. PATENT DOCUMENTS

| | | | |
|---|---|---|---|
| 4,030,717 | 6/1977 | Serlovsky | 269/118 |
| 4,139,143 | 2/1979 | Gumprecht | 228/180 |
| 4,201,303 | 5/1980 | Smith | 211/41 |
| 4,573,430 | 3/1986 | Benson et al. | 118/411 |

OTHER PUBLICATIONS

IBM Technical Disclosure Bulletin, vol. 27, No. 11, Apr. 1985.

Primary Examiner—Nicholas P. Godici
Assistant Examiner—Karen Skillman
Attorney, Agent, or Firm—Fetherstonhaugh & Co.

[57] ABSTRACT

A pallet for holding electronic components or circuit boards for solder coating, soldering or tinning in a soldering machine has a light weight unit which is quick, easy and simple to use. The pallet can be operated in small loading areas and is self contained not requiring easy to lose components. The pallet includes a frame with recesses for locating electronic components or circuit boards, at least one slide bar extending across the frame which has clamp members attached thereto for clamping the electronic components or circuit boards in the recesses, and toggle clamps connected to the slide bar for clamping and unclamping the electronic components or circuit boards with the clamp members, and for moving the clamping members aside from the recesses when not clamped to permit electronic components or circuit boards to be removed and replaced.

11 Claims, 10 Drawing Figures

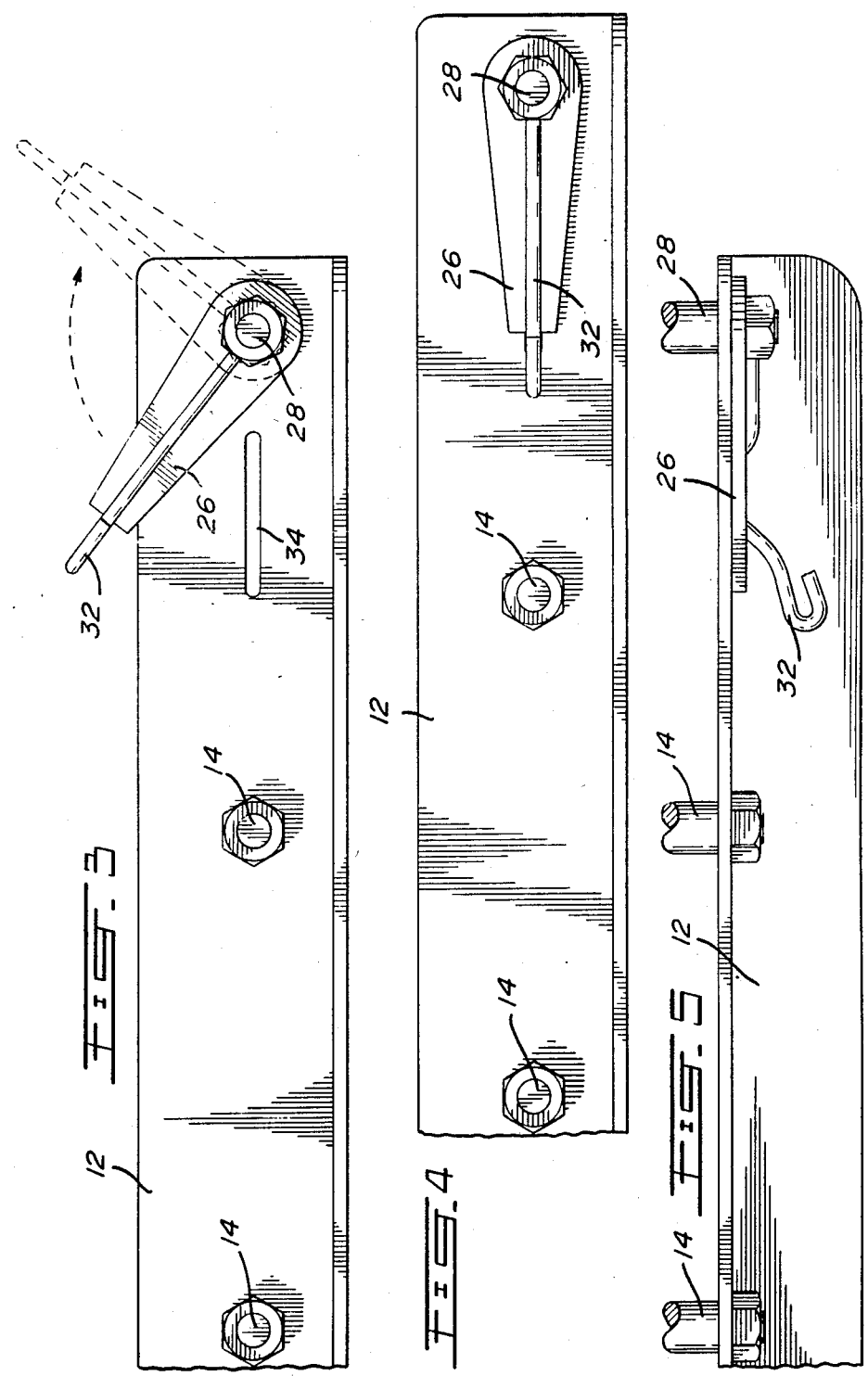

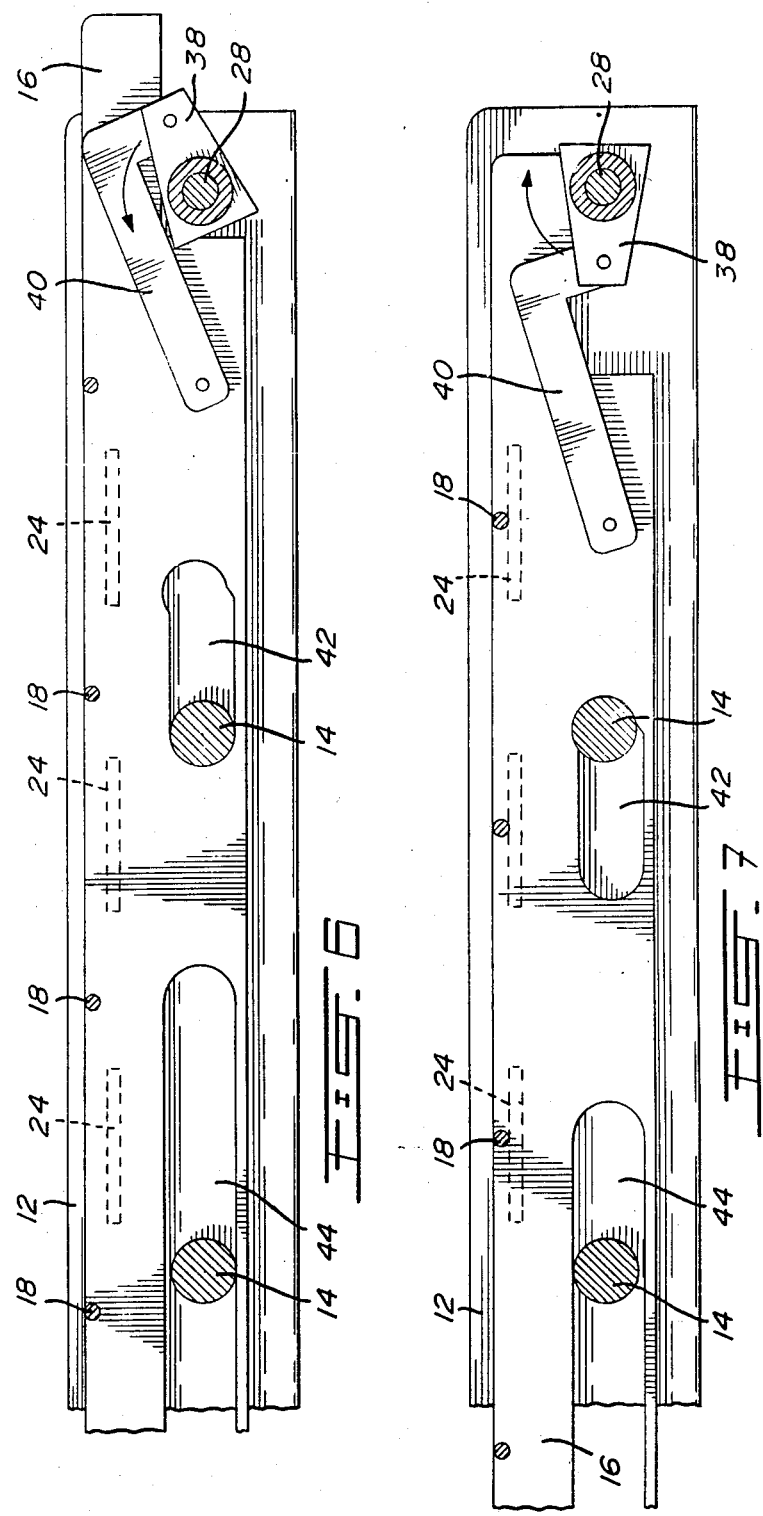

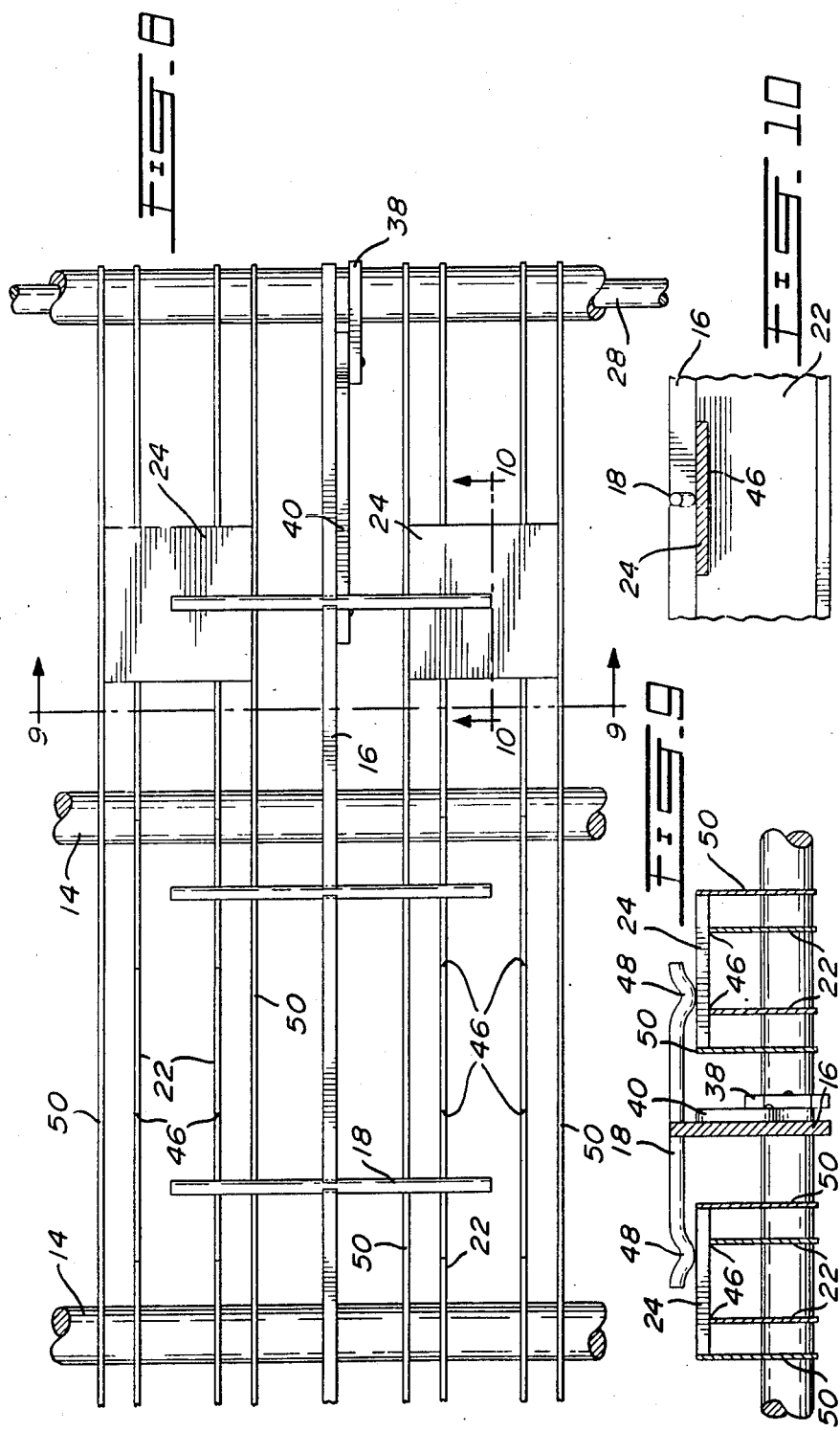

PALLET FOR HOLDING COMPONENTS IN A SOLDERING MACHINE

FIELD AND BACKGROUND OF THE INVENTION

The present invention relates to a pallet for holding electronic components or circuit boards for solder coating, soldering or tinning in a soldering machine. More particularly, the present invention relates to a pallet on which a number of components can be clamped and then transported through a soldering machine for solder coating, soldering or tinning the components.

In today's technology, pallets are often used for holding printed circuit boards and electronic components on a conveyor in solder machines. Types of soldering machines used today include solder wave, dip tank, and vapour phase.

Circuit boards or electronic components which require solder coating, soldering or tinning are generally passed through a soldering machine on a conveyor. In many cases, the conveyor is an in-line conveyor transporting one component at a time. Various types of fixtures or pallets have been used for mounting the components so that leads and other areas can be solder tinned. In some cases, pallets are end loaded with components that have leads extending from two sides of the body. In other cases, pallets are hinged at one side and open up like a book to allow components to be mounted on one frame of the pallet and then held in position by closing a top frame. Such a pallet has two frames, requires twice as much material and also requires twice as much loading area for placing components on the pallet. Other types of pallets require separate members to be bolted or attached in some other manner to hold components in place. These are cumbersome and expensive to produce. They also can absorb large amounts of heat which is detrimental to efficient operation and energy conservation.

Problems that exist with present types of pallets used for mounting components and circuit boards include the complexities of the pallet itself, the time it takes to mount the components on the pallet, and also the loading area necessary to open up the pallet so that components can be inserted. There is a definite advantage in having a pallet that will hold several components or circuit boards. However, this advantage can be off-set if it takes too long to mount and secure the components or circuit boards to the pallet. The pallet itself is generally turned upside down and attached to a conveyor for soldering.

SUMMARY OF THE INVENTION

The aim of the present invention is to provide a pallet wherein electronic components or circuit boards can be placed directly on a pallet, positioned in recesses provided in the pallet and then clamped to the pallet by means of a series of clamp bars operated by a single toggle system. By the term "clamping" is included mechanically holding or retaining, and it is an aim of the invention to provide an easy, quick, simple and low cost clamping arrangement. Thus, there is no need to slide components or circuit boards into grooves in the pallet or to open up a hinged top frame of the pallet and then lay the components on the bottom frame or even to use a screw down device to hold the components in place.

The present invention provides a pallet for holding electronic components or circuit boards in a soldering machine, comprising: frame having recesses, for locating electronic components or circuit boards, at least one slide bar extending across the frame, the slide bar having clamp members attached thereto for clamping the electronic components or circuit boards in the recesses and toggle clamping means connected to the slide bar for clamping and unclamping the electronic components or curcuit boards with clamp members, and for moving the clamping members aside from the recesses when not clamped to permit the electronic components or circuit boards to be removed and replaced.

In other embodiments of the invention, the surfaces of the pallet do not wet with solder and may be either formed of titanium or the surfaces of the pallet coated with tetrafluoroethylene fluorocarbon polymer. Preferably the frame has a plurality of parallel support bars, spaced apart extending along the frame, with rods extending across the frame positioning the parallel support bars, and wherein the recesses are formed by notches cut in the parallel support bars. Clamp members are preferably perpendicular to the slide bar and attached to the slide bar at their center, each of the clamp members is adapted to clamp an electronic component or circuit board on each side of the slide bar.

In one embodiment, the slide bar on the pallet has at least two slots through which pass the rods extending across the frame, the slots each having one raised end such that when the slide bar is positioned with the rods at the raised ends of the slots, the clamp members on the slide bar are in a clamped position. In another embodiment, the toggle clamping means comprises at least one lever to rotate a shaft, the shaft connected to a toggle linkage system on the slide bar, such that rotation of the lever moves the clamp members on the slide bar between the clamped position and an open position. A lever lock permits the slide bar to be locked with the clamp members 30 in the clamped position.

BRIEF DESCRIPTION OF THE DRAWINGS

FIG. 3 is a partial side view showing another embodiment of a pallet with the toggle clamp lever in the open position;

FIG. 4 is a partial side view showing one embodiment of a toggle clamp lever in the clamped position;

FIG. 5 is a partial top view showing the toggle clamp lever on the pallet;

FIG. 6 is a partial sectional side view showing the slide bar of the pallet in the open position;

FIG. 7 is a partial sectional side view showing the slide bar of the pallet in the clamped position;

FIG. 8 is a partial top view showing the slide bar and clamp members in the clamped position;

FIG. 9 is a sectional view taken at line 9—9 of FIG 8;

FIG. 10 is a sectional view taken at line 10—10 of FIG. 8.

DESCRIPTION OF THE PREFERRED EMBODIMENT

Figure 1:
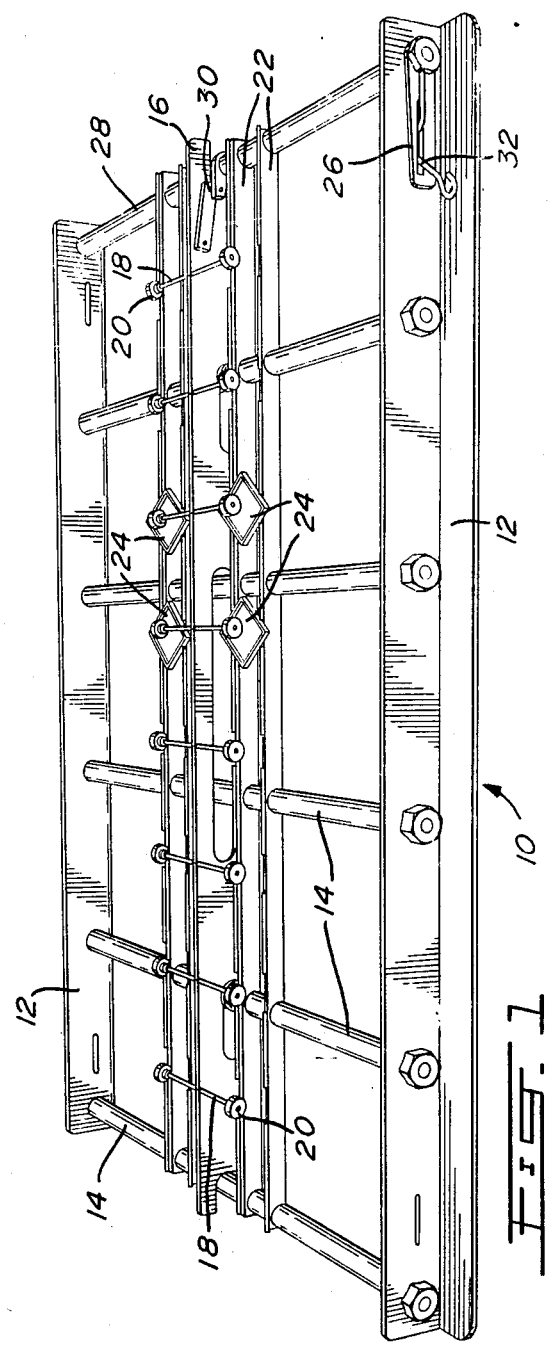
FIG. 1 is an isometric view showing one embodiment of a pallet according to the present invention in the clamped position.
Figure 2:
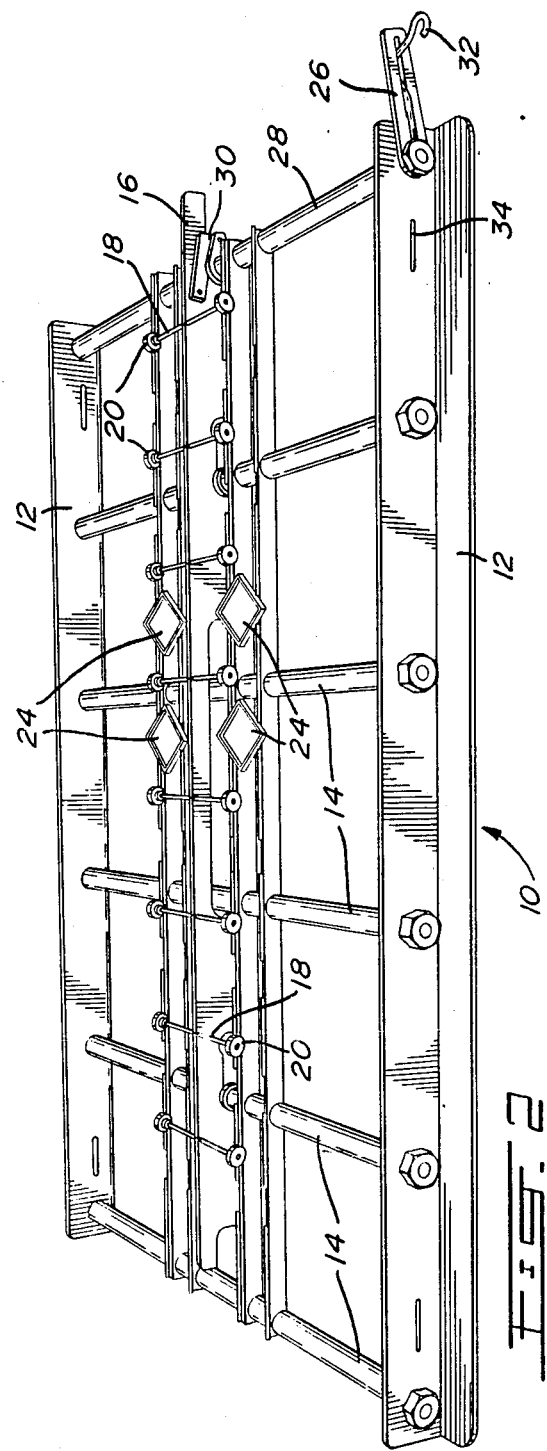
FIG. 2 is an isometric view showing the pallet of FIG. 1 in the open position.

Referring now to FIGS. 1 & 2, a pallet 10 is shown formed of two exterior angles 12 joined together with a plurality of rods 14 spaced substantially apart and parallel to each other. In the center of the pallet 10, and parallel with the angles 12 is a slide bar 16 which has a series of clamp members 18 attached thereto, spaced substantially equally apart and perpendicular to the slide bar 16. The clamp members 18 are attached to the slide bar 16 at their center and are shown to have discs 20 at each end. Two parallel support bars 22, parallel to the slide bar 16, spaced apart and positioned by cylindrical sleeves on the rods 14 provide support for electronic components or circuit boards 24 which are shown in FIGS. 1 & 2 as being square shaped components positioned in a diagonal arrangement. As will be explained in more detail hereafter, recesses, notches or the like are provided in the parallel support bars 22 to locate electronic components 24 of predetermined shapes and sizes.

FIG. 1 illustrates the discs 20 on the ends of the clamp members 18 clamping the electronic components 24 to the parallel support bars 22. Just the discs 20 touch the center of the components 24 so that the edges of the components are completely clear for solder coating, soldering or tinning. FIG. 2 illustrates the slide bar 16 moved into the open position with the clamp members 18 and discs 20 clear of the electronic components 24 so they can be removed and replaced without interference.

A toggle clamp lever 26 is shown at one corner of the pallet 10 connected to the end shaft 28. A toggle linkage system 30 attaches the end shaft 28 to the slide bar 16 so that rotation of the toggle clamp lever 26 moves the slide bar 16 from the clamped position to the open position. A lever lock 32 on the toggle clamp lever 26 locks the toggle clamp lever 26 into a slot 34 shown in FIG 2 when the slide bar 16 is in the clamped position.

The embodiment shown in FIGS. 1 & 2 illustrates only one slide bar 16 in the center of the pallet and two rows of electronic components 24 clamped to the pallet 10. However, space is provided for two further slide bars 16 one on each side of the center slide bar 16 with two further rows of electronic components 24 that can be mounted on parallel support bars 22 positioned by rods 14. The number of slide bars 16 can be varied dependent on size of component and size of pallet required.

In operation, the pallet 10 is placed on a flat surface, and the toggle clamp lever 26 rotated so the slide bar 16 moves to the open position. The components 24 are then placed in the appropriate recesses on the parallel support bars 22 and when the pallet is fully loaded, the toggle clamp lever 36 is closed and the lever lock 32 locked so that the clamp members 18 and discs 20 hold the components 24 to the pallet 10 in the clamped position. The pallet 10 is then turned over and placed on a conveyor of a soldering machine so that the solder contact pins or other areas requiring solder tinning are facing downwards. The arrangement of the components 24 mounted on the pallet 10 is such that all the areas requiring solder tinning are free and not in contact with any parts of the pallet.

In one embodiment, the pallet 10 and all the components forming the pallet are made of titanium which does not wet with solder even when the most aggressive soldering fluxes are used. In another embodiment, the pallet may be formed of other material and coated with a tetrafluoroethylene fluorocarbon polymer coating such as that sold under the trade mark Teflon.

FIGS. 3 to 5 show details of the toggle clamp lever 26 connected to rotating end shaft 28. When in the open position, as shown in FIG. 3, the toggle clamp lever 26 is rotated to the right, rotating about end shaft 28, but when in the clamped position, the toggle clamp lever 26 is in the locked position as shown in FIG. 4 with the lever lock 32 engaging in the slot 34 so that the toggle clamp lever 16 cannot accidentally be opened without moving the lever lock 32 out of the slot 34.

The toggle linkage system 30 is illustrated in FIGS. 6 and 7. A toggle cam 38 is attached to rotating end shaft 28 so that it rotates as the toggle clamp lever 26 is rotated. The toggle cam 38 is connected to a linkage arm 40 which in turn is connected to the slide bar 16. Thus, when the toggle clamp lever 26 is rotated, the toggle cam 38 rotates and the linkage arm 40 moves the slide bar 16 backwards and forwards. Location cam slots 42 are provided in the slide bar 16 at a location where at least two of the rods 14 extend across the pallet. The location cam slots 42 (only one shown) exactly fit over the rods 14 and extend out to the rods with a raised end portion representing the clamping position so that when the slide bar 16 is moved to the clamping position, the rods 14 move in the location cam slots 42 and the slide bar 16 lowers at the raised end portions of the cam slots 42. FIG. 7 illustrates the slide bar 16 in the clamped position with the clamp members 18 clamping the components 24 to the pallet 10. When in the open position, as shown in FIG. 6, the clamp members 18 are raised up and moved to one side so that they are not in the way of removing the components 24 and replacing them with others. Center slots 44 are cut in the center of the slide bar 16 which are wider and longer than the location cam slots 42. These allow some of the rods 14 to pass through the slide bar 16 without acting as guides. The center slots 44 reduce the weight of the pallet and reduce condition heat transfer.

FIGS. 8 to 10 illustrate another embodiment of pallet 10 than that shown in FIGS. 1 and 2, wherein the square shaped components 24 are not mounted diagonally on the pallet, but positioned with edges in line with the parallel support bars 22 of the pallet 10. Two sets of parallel support bars 22 are shown and recesses, notches or the like are cut in the parallel support bars 22 as illustrated in FIGS. 9 and 10 so that recesses 46 are provided to hold the components 24 in specific locations on the pallet 10. Location bars 50, parallel to the parallel support bars 22 locate the components 24 in the recesses 46 of the support bars 22. This makes it easier for installation of the components 24 as they merely slip into the recesses 46 provided in the parallel support bars 22 and between the location bars 50 of the pallet 10. The clamp member 18 shown in FIG. 9 does not have a disc at each end as illustrated in FIGS. 1 and 2 to clamp the components 24, but merely has a bend 48 at each end so that there is a single contact between the bend 48 of the clamp member 18 and the component 24.

Various changes may be made to the embodiments shown without departing from the scope of the present invention which is limited only by the following claims.

The embodiments of the invention in which an exclusive property or privilege is claimed are defined as follows.

1. A pallet for holding electronic components or circuit boards in a soldering machine, comprising:
   frame having recesses for locating electronic components or circuit boards;
   at least one slide bar extending across the frame, the slide bar having clamp members attached thereto for clamping the electronic components or circuit boards in the recesses, and toggle clamping means connected to the slide bar for moving said slide bar to cause clamping and unclamping the electronic components or circuit boards with the clamp members, and for moving the slide bar and clamping members aside from the recesses when not clamped to permit the electronic components or circuit boards to be removed and replaced.

2. The pallet as claimed in claim 1 wherein the surfaces of the pallet do not wet with solder.

3. The pallet as claimed in claim 2 wherein the pallet is formed of titanium.

4. The pallet as claimed in claim 2 wherein the surfaces of the pallet are coated with tetrafluoroethylene fluorocarbon polymer.

5. The pallet as claimed in claim 1 wherein the frame has a plurality of parallel support bars, spaced apart extending along the frame, with rods extending across the frame positioning the parallel support bars, and wherein the recesses are formed by notches cut in the parallel support bars.

6. The pallet as claimed in claim 5 wherein the slide bar is parallel to the parallel support bars.

7. The pallet as claimed in claim 6 wherein the clamp members are perpendicular to the slide bar and attached to the slide bar at their center, each of the clamp members adapted to clamp an electronic component or circuit board on each side of the slide bar.

8. The pallet as claimed in claim 5 wherein the slide bar has at least two slots through which pass the rods extending across the frame, the slots each having one raised end such that when the slide bar is positioned with the rods at the raised ends of the slots, the clamp members on the side bar are in a clamped position.

9. The pallet as claimed in claim 8 wherein the toggle clamping means comprises at least one lever to rotate a shaft, the shaft connected to a toggle linkage system on the slide bar, such that rotation of the lever moves the slide bar and clamping member between the clamped position and an open position.

10. The pallet as claimed in claim 9 including a lever lock to lock the lever to the frame when the clamp members on the slide bar are in the clamped position.

11. The pallet as claimed in claim 1 wherein the recesses for locating electronic components are made to fit predetermined shapes of components.

* * * * *